(12) United States Patent
Farina Vargas et al.

(10) Patent No.: US 11,134,174 B2
(45) Date of Patent: Sep. 28, 2021

(54) TRANSFORMING A COLOR SPACE VECTOR INTO A NEUGEBAUER PRIMARY AREA COVERAGE VECTOR

(71) Applicant: HEWLETT-PACKARD DEVELOPMENT COMPANY, L.P., Spring, TX (US)

(72) Inventors: Xavier Farina Vargas, Sant Cugat del Valles (ES); Peter Morovic, Sant Cugat del Valles (ES); Jan Morovic, Colchester (GB)

(73) Assignee: Hewlett-Packard Development Company, L.P., Spring, TX (US)

( * ) Notice: Subject to any disclaimer, the term of this patent is extended or adjusted under 35 U.S.C. 154(b) by 183 days.

(21) Appl. No.: 16/475,650

(22) PCT Filed: Apr. 24, 2017

(86) PCT No.: PCT/US2017/029091
§ 371 (c)(1),
(2) Date: Jul. 2, 2019

(87) PCT Pub. No.: WO2018/199882
PCT Pub. Date: Nov. 1, 2018

(65) Prior Publication Data
US 2021/0136254 A1 May 6, 2021

(51) Int. Cl.
*H04N 1/54* (2006.01)
*G06K 15/02* (2006.01)
*H04N 1/60* (2006.01)

(52) U.S. Cl.
CPC .......... *H04N 1/54* (2013.01); *G06K 15/1835* (2013.01); *G06K 15/1878* (2013.01); *H04N 1/60* (2013.01); *H04N 1/6008* (2013.01); *H04N 1/6019* (2013.01)

(58) Field of Classification Search
None
See application file for complete search history.

(56) References Cited

U.S. PATENT DOCUMENTS

| 4,670,780 A | 6/1987 | McManus et al. |
| 8,810,857 B2 | 8/2014 | Bestmann |
| 9,462,162 B2 | 10/2016 | Paul |

(Continued)

FOREIGN PATENT DOCUMENTS

WO    WO-2016066202 A1    5/2016

OTHER PUBLICATIONS

Bugnon et al., "Recovering Neugebauer Colorant Reflectances and Ink Spreading Curves from Printed Color Images," Feb. 10, 2011, 33 p., Color Research and Applications, vol. 39, No. 3. < https://infoscience.epfl.ch/record/198779/fil >.

(Continued)

*Primary Examiner* — Scott A Rogers
(74) *Attorney, Agent, or Firm* — HP Inc. Patent Department

(57) ABSTRACT

Example methods and systems are described in which a color space vector is transformed into a Neugebauer primary area coverage (NPac) vector, to be used for printing. In some examples, the color space vector is transformed into a NPac vector on the basis of criteria associated to amounts or probabilities of Neugebauer primaries (NPs).

14 Claims, 5 Drawing Sheets

(56) References Cited

U.S. PATENT DOCUMENTS

| | | | |
|---|---|---|---|
| 9,497,356 B1 | 11/2016 | Pjanic et al. | |
| 10,897,556 B2* | 1/2021 | Morovic | H04N 1/40087 |
| 2010/0214576 A1 | 8/2010 | Morovic et al. | |
| 2012/0163715 A1 | 6/2012 | Murray et al. | |
| 2016/0080608 A1 | 3/2016 | Morovic et al. | |
| 2017/0064145 A1* | 3/2017 | Morovic | H04N 1/6055 |
| 2019/0373138 A1* | 12/2019 | Gomez Minano | H04N 1/6008 |
| 2020/0125904 A1* | 4/2020 | Morovic | H04N 1/6019 |
| 2020/0177768 A1* | 6/2020 | Morovic | H04N 1/603 |
| 2020/0210790 A1* | 7/2020 | Maestro Garcia | H04N 1/00023 |
| 2020/0228680 A1* | 7/2020 | Morovic | H04N 1/60 |
| 2020/0320357 A1* | 10/2020 | Morovic | G06K 15/1822 |
| 2020/0404123 A1* | 12/2020 | Morovic | H04N 1/6019 |
| 2021/0004654 A1* | 1/2021 | Morovic | G06K 15/027 |
| 2021/0006687 A1* | 1/2021 | Morovic | H04N 1/644 |
| 2021/0056367 A1* | 2/2021 | Maestro Garcia | G06K 15/1868 |

OTHER PUBLICATIONS

HPDC, "International Search Report and Written Opinion," dated Jan. 25, 2018, International App. No. PCT/US2017/029091, 7 p.

* cited by examiner

TRANSFORMING A COLOR SPACE VECTOR INTO A NEUGEBAUER PRIMARY AREA COVERAGE VECTOR

BACKGROUND

A printing system using a probability-space image processing pipeline, such as the Halftone Area Neugebauer Separation (HANS) pipeline, may output a printed image. A mapping from a color space to a Neugebauer primary area coverage (NPacs) may be defined. A lookup table (LUT) may permit to transform color data from a color space to an area coverage.

DETAILED DESCRIPTION

Figure 1:
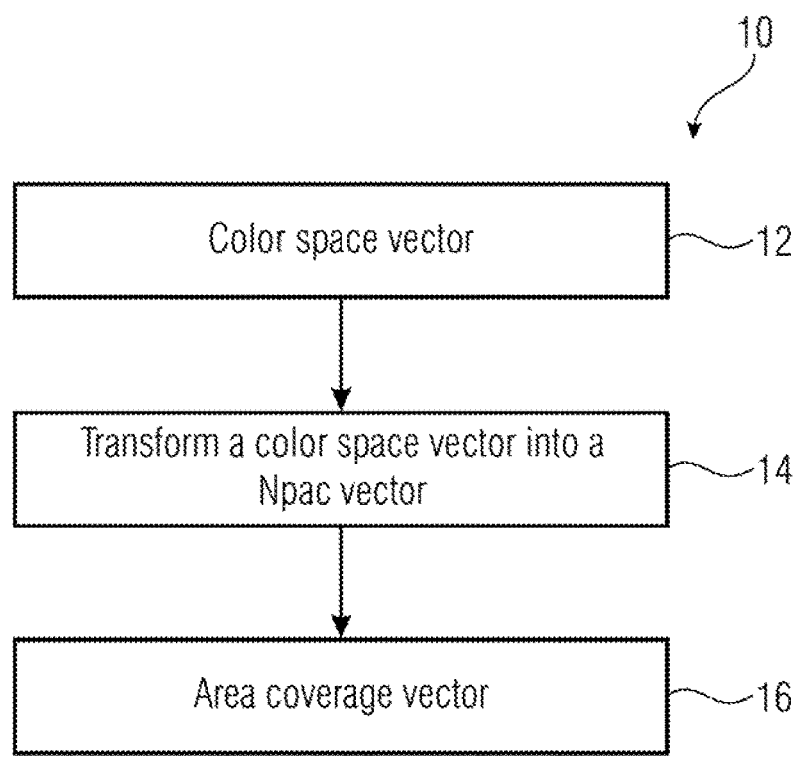
FIG. 1 shows a schematic view of a method according to an example.

Hereinafter, examples are directed to printing systems and methods, e.g., using ink-jet printers, laser printers, xerographic printers, three-dimensional (3D) printers or other printers.

Printing systems permit a representation of images to human eye or obtain objects. Printing systems may be bi-dimensional (2D) printing systems or three-dimensional (3D) printing systems. 2D printing systems may generate a print job as a result of a number of chromatic or achromatic colorants disposed on top of a substrate (e.g., paper). Colorant (e.g., ink) amounts are chosen for generating elements (e.g., dots) of a print job. 3D printing systems may generate a three-dimensional object by printing on a bed of build material. A printing system may include a printer, which may be a 2D printer or a 3D printer. In certain cases, the printer may be an inkjet printer, for example a scanning inkjet printer or a page wide array printer. Other examples of printing systems may laser printers, print presses, xerographic printers, and electrophotographic printers.

A colorant may be any print material, e.g., ink, toner, fluid, varnish, build material, etc. The colorant may also be defined with reference to a color space, which comprises the colors that may be obtained by a particular printer. A colorant may be defined with reference to a particular representation model or color space, such as Red-Green-Blue (RGB) color space, Cyan-Magenta-Yellow (CMY) color space, Cyan-Magenta-Yellow-Black (CMYK) color space, or colorant color spaces. Chromatic colorants (e.g., Red, Green, Blue, Cyan, Magenta, Yellow, Orange, Violet, and so on) and achromatic colorants (e.g., Black, Grey, White) may be used. A colorant may be, for example, a clear treatment fluid.

A printing system or method may rely on a sequence of passages forming a pipeline. With a color space image processing pipeline, computations are performed on values (e.g., expressed in terms of quantities of RGB, CMY, or CMYK) associated to colorants (e.g., inks) to be deposited onto a substrate. An original image data may comprise color data represented in a color space (e.g., RGB, CMY, CMYK, etc.) in which chromatic and achromatic color values are associated to different quantities of colorants. It is possible to define, for each pixel of an image, a colorant vector formed by a multiplicity of components (e.g., three components in RGB and CMY color space and four components in a CMYK color space) and/or their quantities (e.g., number of drops or weight). A colorant vector for printing a Magenta pixel may be represented, for example, as {C=0, M=1, Y=0}.

With a probability space image processing pipeline, such as the Halftone Area Neugebauer Separation (HANS) pipeline, colorants to be deposited are treated in terms of probabilities, such as statistical distributions of color states. At the end of the pipeline, a random process establishes the colorant that is to be actually deposited on the substrate on the basis of probabilities values associated to each pixel. The color data of a color space may be mapped to a Neugebauer Primary area coverage (NPac) space, so that an image to be printed comprises pixels whose color values are defined in terms of NPac vectors that specify probability distributions for different pixel states. Each pixel may be associated to a particular vector of probabilities. Each probability may be associated to a basic colorant or a basic combination of colorants. A Neugebauer Primary (NP) may be defined, for example, as C, M, Y, CM, CY, MY, and CMY. It is also possible to define a fictive colorant W referring to the Blank space left when no print material is applied in one part of the substrate (W may be sometimes understood as the color value associated to the substrate, which in some cases may be White; in the case of a printer which also ejects White colorant, the White colorant participates to generate the NPs as any other colorant C, M, Y, for example). Each Neugebauer Primary (NP) may be understood as a "color primary": the image to be represented is made of a collection of multiple NPs (each having a particular probability of being assigned to each pixel).

In a binary (bi-level) color print systems (e.g., where a printer produces at maximum one single drop of one single ink for each dot), a NP can be one of $2^k$ combinations of k colorants within the printing system. For example, $2^3$=8 NPs are defined: C, M, Y, CM, CY, MY, CMY, and W. In case of bi-colorant tri-level printing (in which the printer applies up to two drops for each of two colorants for the same pixel), a NP can be one of $(2+1)^2$ combinations of colorants, and the NPs are chosen among W, M, MM, C, CM, CMM, CC, CCM, CCMM. In general terms, the following formula is valid:

$$N=(m+1)^k$$

where N is the number of NPs, m the maximum number of quantity elements (e.g., drops) for each pixel, and k is the number of colorants.

If a NPac vector is {W=0, M=0, MM=1, C=0, CM=0, CMM=0, CC=0, CCM=0, CCMM=0}, a pixel is generated, with 100% certainty, by applying two Magenta colorant drops onto the same pixel position in the substrate. If the NPac vector is {W=0, M=0.5, MM=0.5, C=0, CM=0, CMM=0, CC=0, CCM=0, CCMM=0}, then the pixel has 50% of probability of being constituted by one single drop of M and 50% of probability of being constituted by two drops of M. Notably, the sum of the values associated to each NP is 1, in order to cover the whole spectrum of probabilities.

When an image defined in a color space (e.g., CMY) is to be printed using a probability space image processing pipeline, the color value of each pixel may be mapped into an area coverage (NPac). A lookup table (LUT) may map color spaces into NPacs. For example, on the basis of the components of each colorant vector, a NPac vector may be created by referring to values stored in the LUT.

FIG. 1 shows a method 10. The method 10 comprises a block 14 mapping a color space vector 12 to a Neugebauer primary area coverage (NPac) vector 16. The block 14 may transform a color space vector into a NPac vector, to be used for printing, on the basis of criteria associated to amounts or probabilities associated to NPs. The criteria may be defined, for example, by imposing quantity or probability constraints on the obtained NPac vector. The block 14 may provide an operation of convex optimization (e.g., linear programming, quadratic programming, convex programming). The method 10 may be used, for example, for generating a LUT, which maps color space vectors 12 to NPac vectors 16, e.g., by reiterating the block 14 to define a transformation from a color space to a NPac space. The method 10 permits, for example, to map a pixel value of an image to be printed to a NPac vector to be used for printing with a probability space image processing pipeline (e.g., HANS pipeline).

In general, mapping color spaces into NPacs does not univocally determine the NPac vector associated to the original colorant vector. In bi-colorant tri-level printing, for example, the colorant vector {C=0.5, M=0.5} may be mapped to the NPac vector {W=0.5, M=0, MM=0, C=0, CM=0.5, CMM=0, CC=0, CCM=0, CCMM=0} or {W=0, M=0.5, MM=0, C=0.5, CM=0, CMM=0, CC=0, CCM=0, CCMM=0}. To the contrary, in general a NPac vector univocally determines the colorant vector which maps.

This concept may be understood as follows: while there is the possibility for expressing a transformation from a NPac space to a color space in closed form (e.g., by a single transformation matrix), the reverse operation is not uniquely determined.

A colorant vector (e.g., {C, M} for bi-colorant multi-level printing, such as tri-level printing) may be expressed as a vector such as $$b=(1,i_1,i_2)^T$$

where the values $i_j$ are the quantities of each colorant. For example, $i_1$ may be the quantity of C and $i_2$ may be the quantity of M. A quantity may be expressed, for example, as a number of drops, in percent, in mass, in mass units, and so on. The first value $i_0=1$ refers to the Blank value W, which is always present: with or without applying colorant, a fictive drop of Blank may be held to be always present (Blank may be considered as always overlapped to any colorant).

A NPac vector may be defined as a vector such as $$x=(x_0,x_1,x_2,x_3,x_4,x_5,x_6,x_7,x_8)^T$$

where $x_0$, $x_1$, $x_2$, $x_3$, $x_4$, $x_5$, $x_6$, $x_7$, $x_8$ correspond to the probabilities of the NPs, such as W, M, MM, C, CM, CMM, CC, CCM, CCMM, respectively.

A matrix which transforms any value of x into values of b may be a matrix having columns defined by combinations of colorant vectors b:

$$A = \begin{pmatrix} 1 & 1 & 1 & 1 & 1 & 1 & 1 & 1 & 1 \\ 0 & 0 & 0 & 1 & 1 & 1 & 2 & 2 & 2 \\ 0 & 1 & 2 & 0 & 1 & 2 & 0 & 1 & 2 \end{pmatrix}$$

It may be seen that the rows are associated to different colorants, and, in particular, the first row is associated to Blank (which is always present), the second row is associated to quantity elements (e.g., drops) of Cyan and the third row is associated to quantity elements of Magenta. Notably, the columns are associated to the different NPs, such as W, M, MM, C, CM, CMM, CC, CCM, CCMM, respectively. For example, the first column $(1,0,0)^T$ is associated to W (Blank), as no Cyan and no Magenta are applied to the substrate. The second column $(1,0,1)^T$ is associated to M, as one single quantity element (e.g., drop) of Magenta is applied, while no Cyan is applied. The third column $(1,0,2)^T$ is associated to MM, as two quantity elements (e.g., drops) of Magenta are applied, while no drop of Cyan is applied.

A relationship between the colorant vector and the NPac vectors may be expressed as:

$$Ax=b$$

This equation expresses a transformation from a NPac space to a color space. For the purpose of arriving at defining an optimal transformation from a color space to a NPac space, this equation may be understood as an anti-transformation (i.e., a transformation which is a reverse transformation with respect to the transformation from the color space to the NPac space). As the color space has less dimensions than the NPac space (as can be appreciated by the fact that the matrix A is not an invertible square matrix), the solution of finding a relationship of the type x=Ab is not univocally determined.

For each NPac vector x the following relationship is valid:

$$\begin{cases} 0 \le x_i \le 1 \\ \sum_{i=0}^{N-1} x_i = 1 \end{cases}$$

where N is the number of NPs (nine for a bi-colorant bi-level print system).

For each NPac vector x the following relationship is valid:

$$\sum_{j=0}^{N-1} x_j n_{ij} = i_i$$

where $n_{ij}$ is the quantity (e.g., number of drops) associated to the $j^{th}$ component of the $i^{th}$ NP. By summing the probabilities of each $j^{th}$ component of each NP times the number of drops, the expected quantity of colorant matches the quantity set out in the colorant vector.

It is possible to search for criteria which permit to obtain the optimal transformation from a color space to a NPac space.

For example, a criterion for a metric associated to a color space vector and/or the area coverage may be used. The criterion may be based, for example, on determining conditions on quantitative values of the different NPs in a NPac vector. For example, it may be chosen the criterion of minimizing the white space, which may involve setting a condition to avoid NPac vectors having W≠0. To the contrary, it may be chosen the criterion of minimizing the overprinting, which may involve setting a condition to avoid NPac vectors having double drops in the same pixel. Examples may be based on objective functions as conditions within a convex optimization (e.g., linear programming, quadratic programming, etc.) technique.

It is possible, for example, to impose to the NPac vectors to have a component W=0. Using this criterion, it is possible to obtain a vector $x=(0\ x_1\ x_2\ x_3\ x_4\ x_5\ x_6\ x_7\ x_8)^T$ that verify the equation $Ax=b$ and, at the same time, does not provide a Blank pixel.

It is possible to apply an objective function to impose conditions on the values of the NPac vector x. For example, it is possible to define an objective function in the form of $$c=(c_0\ c_1\ c_2\ c_3\ c_4\ c_5\ c_6\ c_7 c_8)^T$$

For example, it is possible to define min $c^T x$, i.e.:

$$\min \left[\begin{pmatrix} c_0 & c_1 & c_2 & c_3 & c_4 & c_5 & c_6 & c_7 & c_8 \end{pmatrix} \begin{pmatrix} x_0 \\ x_1 \\ x_2 \\ x_3 \\ x_4 \\ x_5 \\ x_6 \\ x_7 \\ x_8 \end{pmatrix}\right]$$

where the values of the elements of the objective function c are chosen according to a criterion that permits to achieve the intended objective.

For example, by defining different values of $c_0$ and $c_1$, different quantity relationships are implied for the NPs W ($x_0$) and C ($x_1$).

Therefore, it is possible to apply the convex optimization on the basis of:

$$\begin{cases} Ax = b \\ \min c^T x \end{cases}$$

The convex optimization (e.g., linear programming, quadratic programming, etc.) technique may be performed, for example, by using a simplex procedure.

An example is here discussed for the case in which it is intended to follow the criterion of minimizing the number of Blank spaces in a bi-colorant (C and M) tri-level print systems (each pixel being constituted by zero, one, or two colorant drops). A particular case of a colorant vector to be transformed into a NPac vector which is appropriate for this purpose may be discussed. A colorant vector {C=0.8, M=1.2} may be represented as $$b=(1,i_1=0.8,i_2=1.2)^T$$

Therefore, the equation $Ax=b$ may be expressed as:

$$\begin{pmatrix} 1 & 1 & 1 & 1 & 1 & 1 & 1 & 1 & 1 \\ 0 & 0 & 0 & 1 & 1 & 1 & 2 & 2 & 2 \\ 0 & 1 & 2 & 0 & 1 & 2 & 0 & 1 & 2 \end{pmatrix} \begin{pmatrix} x_0 \\ x_1 \\ x_2 \\ x_3 \\ x_4 \\ x_5 \\ x_6 \\ x_7 \\ x_8 \end{pmatrix} = \begin{pmatrix} 1 \\ 0.8 \\ 1.2 \end{pmatrix}$$

In order to follow the criterion of minimizing the number of Blank pixels, an object function may be chosen, for example, by imposing $c_0=+\infty$ (in computations, this may be obtained by choosing an extremely high value, such as $10^{10}$ or $10^{26}$) and $c_i=0$ for the other components of c, so as to arrive at:

$$(+\infty\ 0\ 0\ 0\ 0\ 0\ 0\ 0\ 0) \begin{pmatrix} x_0 \\ x_1 \\ x_2 \\ x_3 \\ x_4 \\ x_5 \\ x_6 \\ x_7 \\ x_8 \end{pmatrix}$$

The choice of $c_0=+\infty$ is justified by the fact that the sum of the components of $x_0 \ldots x_8$ is 1 (see above). In order to contrast the infinite value of $c_0$, it follows that $x_0=0$. As $x_0$ corresponds to the NP W (Blank), the resulting NPac vector is the combination of probabilities that minimizes the quantity of Blank spaces.

By solving the equation $Ax=b$ under this condition, a solution is $$x_{min\_white\_space}=(0\ 0\ 0.4\ 0.4\ 0\ 0\ 0\ 0\ 0.2)^T,$$

i.e. the NPac is {C=0.4, MM=0.4, CCMM=0.2}. This means that there is 40% of probability that the pixel is constituted by a drop of Cyan, 40% of probability that the pixel is constituted by two drops of Magenta, and 20% of probability that the pixel is constituted by two drops of Cyan and two drops of Magenta. Other possibilities are excluded (in particular, the pixel cannot be Blank). For the purpose of minimizing the white space, such a NPac vector is the NPac vector which best maps the colorant vector {C=0.8, M=1.2}.

An example is here discussed for the case where it is intended to transform the colorant vector {C=0.8, M=1.2} into a NPac vector which maximizes (instead of minimizing) the number of Blank spaces. While, in the equation $Ax=b$, A and b are not changed, the objective function may be chosen so as $c_0=-\infty$ (e.g., $-10^{26}$) and the other components of c are equal to 0. This choice is justified by the fact that, in order to contrast the extremely negative value of $c_0$, the value of $x_0$ shall be extremely high. The resulting vector which fulfils this criterion may be:

$$x_{max\_white\_space}=(0.4\ 0\ 0.2\ 0\ 0\ 0\ 0\ 0\ 0.4)^T$$

that is the NPac {W=0.4, MM=0.2, CCMM=0.4}. In this case, there is the 40% of probability that the pixel is Blank, while the probability that a pixel is formed by two drops of C and two drops of M are 40%, as well. For the purpose of maximizing the white space, such a vector is the NPac vector which best maps the colorant vector {C=0.8, M=1.2}.

Several other possibilities are at disposal of a user (user). Just to give an example, among the conditions, if it is set $c_i=c_j$, the same probabilities are obtained for different NPs.

In some examples, it is also possible to vary the values of c and to perform prints based on the same colorant vector to inspect or measure the different results. For example, it is possible to vary the values of c according to a random fashion or according to a particular function which is to be analysed.

Figure 2:
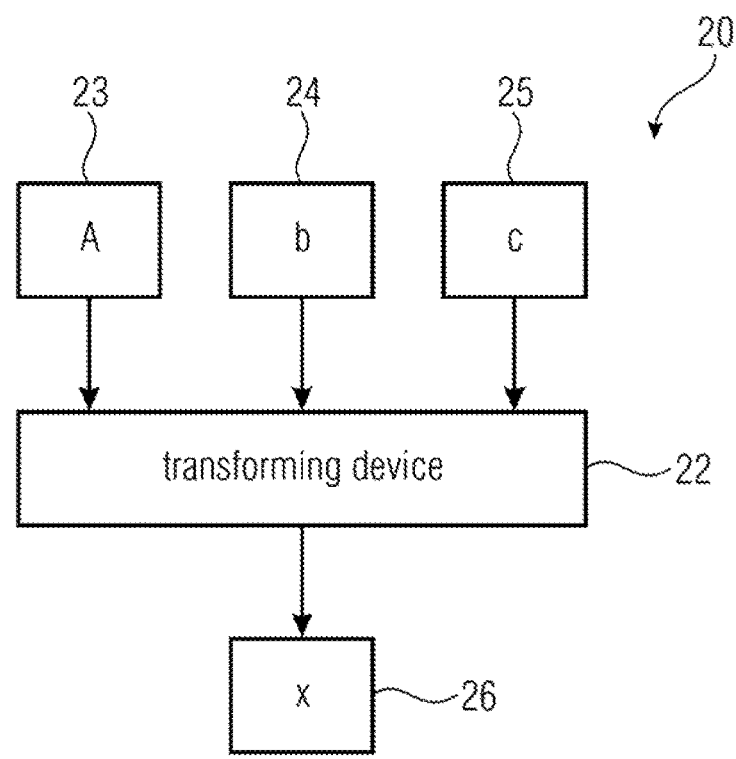
FIG. 2 shows a schematic view of a system according to an example.

FIG. 2 shows a system 20, according to an example, which may implement the method 10. The system 20 may comprise a device (such as a transforming device 22), which may perform a transformation from colorant vectors to NPac vectors, e.g., according to the method 10. The transforming device 22 may perform, for example, a convex optimization (linear programming, quadratic programming, etc.) operation.

The transforming device 22 may be provided with data 23 associated to the transformation to be operated. For example, a matrix A may be provided. The matrix A may be the matrix to convert the color space into the NPac space, and is therefore the matrix that permits an anti-transformation with respect to the purpose of converting colorant vectors into NPac vectors. Therefore, the matrix A is a data associated to the transformation, even though not univocally. The matrix A may be constituted by columns associated to colorant vectors, e.g., associated to different chromatic or achromatic color values and/or different quantities. In the matrix A, each row may correspond to a different colorant or to W (Blank). Each entry of the matrix A may correspond to the quantity (e.g., number of drops) of colorant that may be applied for each NP. A may be a N*k matrix, where $N=(m+1)^k$ and k is the number of colorants, m is the maximum number of drops for each pixel, and N is the is the number of NPs.

The device 22 may be provided with data 24 associated to a colorant vector to be transformed into an area coverage (NPac) vector, e.g., a vector in the form $b=(1, i_1, i_2, \ldots i_k)^T$, where k is the number of colorants (e.g., in a space RGB or CMY, k=3, while in a space CMYK, k=4). The vector b may have the dimension of k+1 to keep in account W (Blank), which may be understood as being always present and may therefore be represented as 1 (probability 100%).

The device 22 may be provided with data 25 associated to a criterion (e.g., identified with an objective function c which sets out an additional condition to be fulfilled) that may be selected by a user or defined in order to achieve an intended purpose.

The device 22 may provide an output data 26 (e.g., NPac vector x) which is the transformation of the colorant vector b into a NPac vector.

Figure 3A:
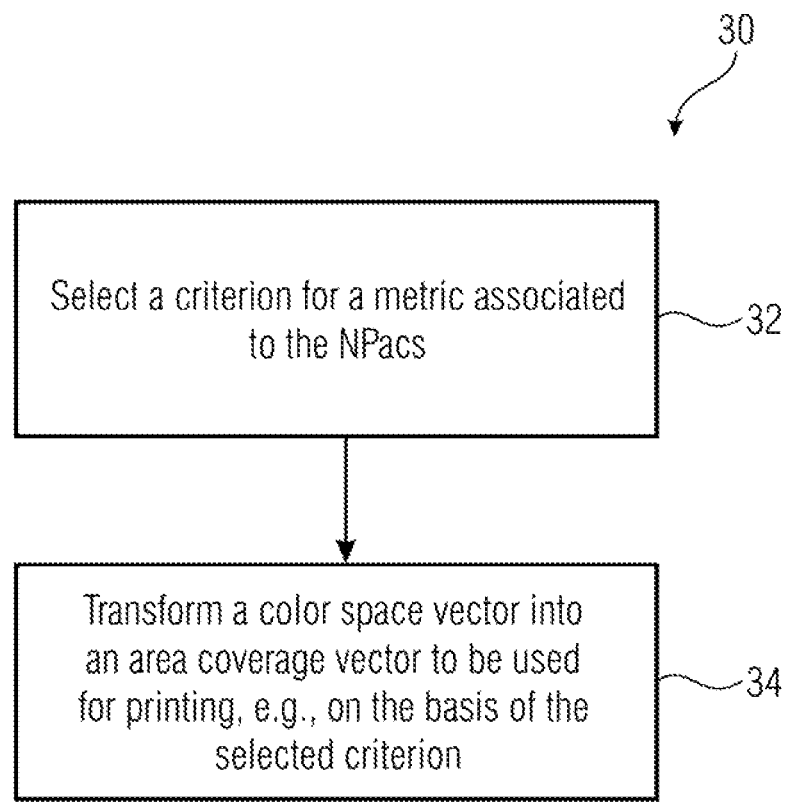
FIGS. 3a and 3b show schematic views of methods according to examples.

FIG. 3a shows a method 30 which may implement the method 10 and may be used by the system 20. At block 32, a criterion may be selected for a metric associated to the NPac vector. For example, conditions associated to the objective function c may be chosen. At block 34, a color space vector may be transformed into a NPac vector to be used for printing (e.g., as an element of a LUT to be used for converting input image data into HANS data).

Figure 3B:
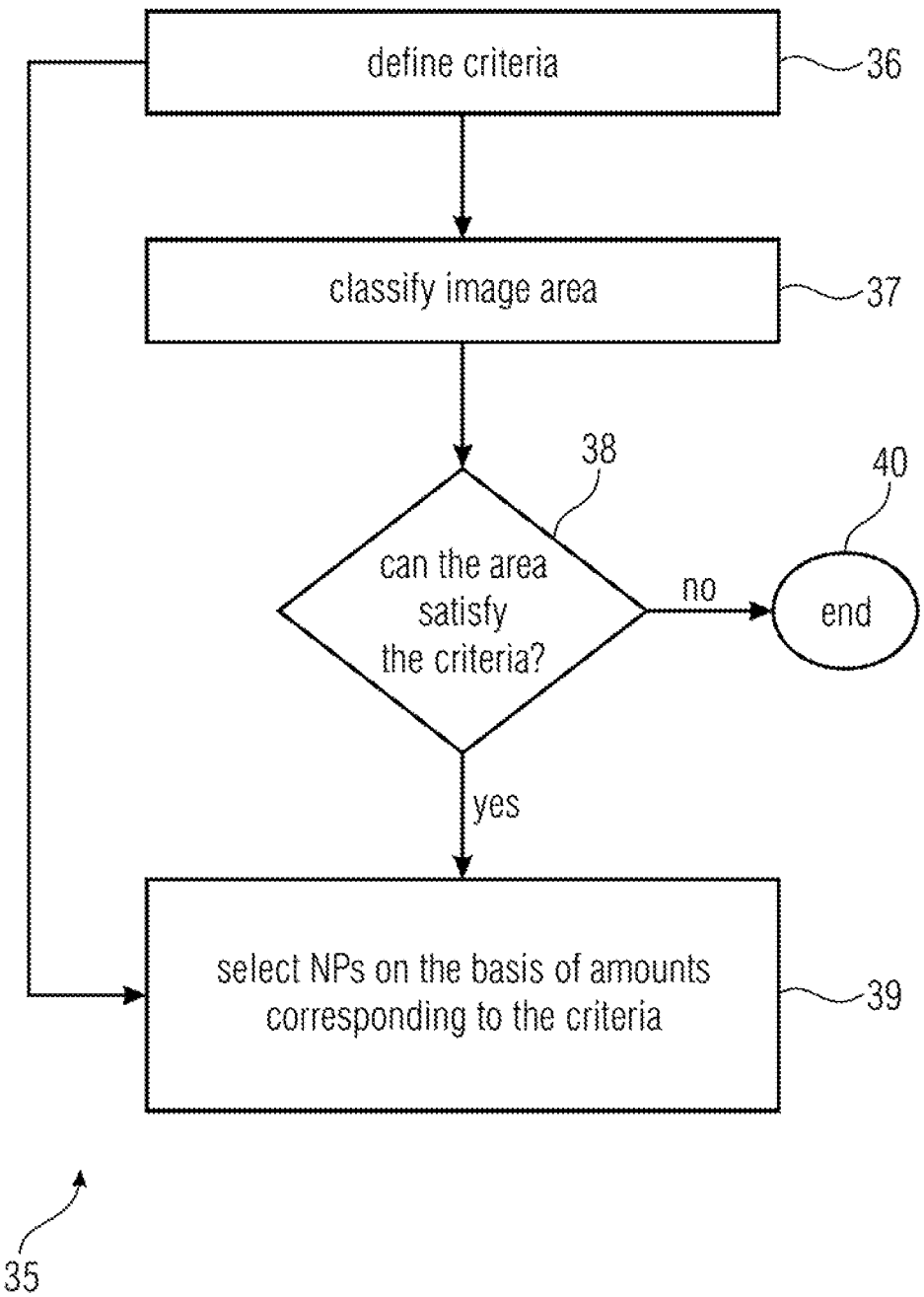

FIG. 3b shows a method 35. The method 35 may comprise a block 36 of defining criteria. The criteria may comprise, for example, the minimization in the number of specific NPs to be chosen for representing an image in the HANS pipeline. The criteria may relate to a metric associated to the components of the NPac vectors (e.g., the quantity of Blank spaces, for example). The criteria may be based on a user's selection, for example.

In examples, a block 37 of classifying an image may be performed. For example, a metric associated to the criteria may be evaluated.

At block 37, it is estimated if, on the basis of the classification of block 37, the criteria set out in block 36 may be satisfied.

If the criteria may be satisfied, at block 39 NPs are selected on the basis of amounts corresponding to the criteria. For example, if it is requested to minimize the Blank spaces (36), and this criteria may be followed (37, 38), a low-probability value is associated to the W in the NPacs, and, accordingly, the lowest number of White pixels are printed.

In case the criteria may not be satisfied, the procedure ends at block 40.

In examples, the defined criteria may be directly provided to block 39, without classification of the image area.

Figure 4:
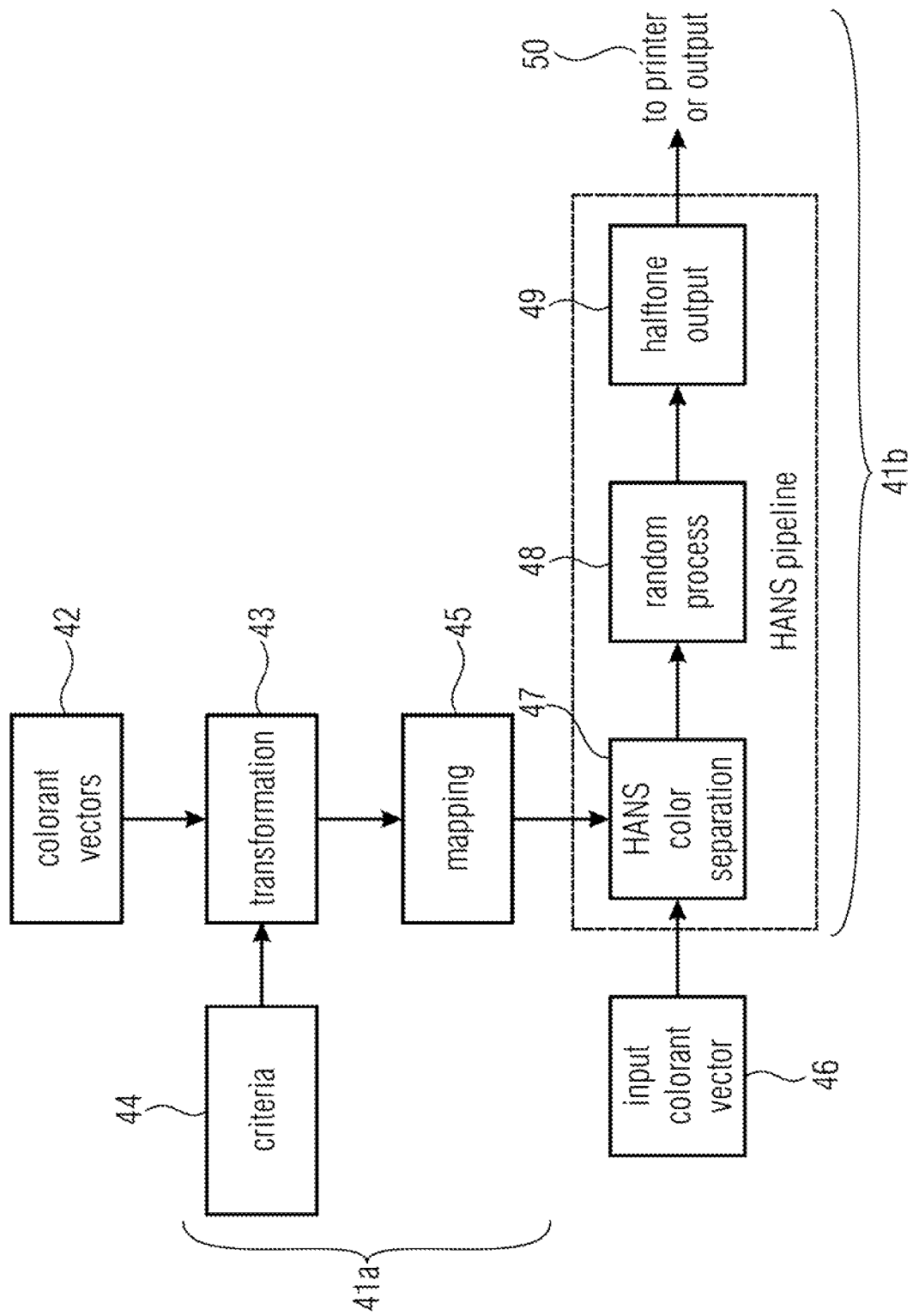
FIG. 4 shows a schematic view of methods according to an example.

FIG. 4 shows a method 41a of creating a mapping from a color space into NPacs and a method 41b for defining the color values for a print job.

The method 41a may comprise a transformation 43 which may comprise, for example, block 14 and/or block 34 and may be performed, for example, by the device 22. The transformation 43 may map colorant vectors 42 into NPac vectors on the basis of criteria 44. By transforming the vectors of a particular color space, a mapping 45 (such as a LUT) may be created. The mapping may be stored in a non-volatile storage space of a printing system, for example.

When performing a print job using the method 41b, an input colorant vector 46, associated to a pixel, a dot, or an element in the substrate, may be provided. At block 47, a transformation from the colorant vector 46 into a NPac vector may be performed. For this purpose, the mapping 45 (e.g., a LUT) may be used. At block 48 a random process for actually determining the colorant to be used for the pixel, on the basis of the probability values associated to each NP, may be performed. An halftone output 49 may therefore be obtained. This output may be provided at 50 to a printer, transmitted to a remote computer, or stored in a mass storage unit.

The method 41b may be performed for the plurality of pixels, dots, or elements of an image. The result may be a printed image in which the quantity relationships between the NPs observe the selected criteria. For example, the Blank spaces may be actually excluded in those area in which the transformation has caused the minimization of Blank NPs. Therefore, the images may be made to fulfil criteria established on magnitudes (or probabilities) set out for the colorants.

Figure 5:
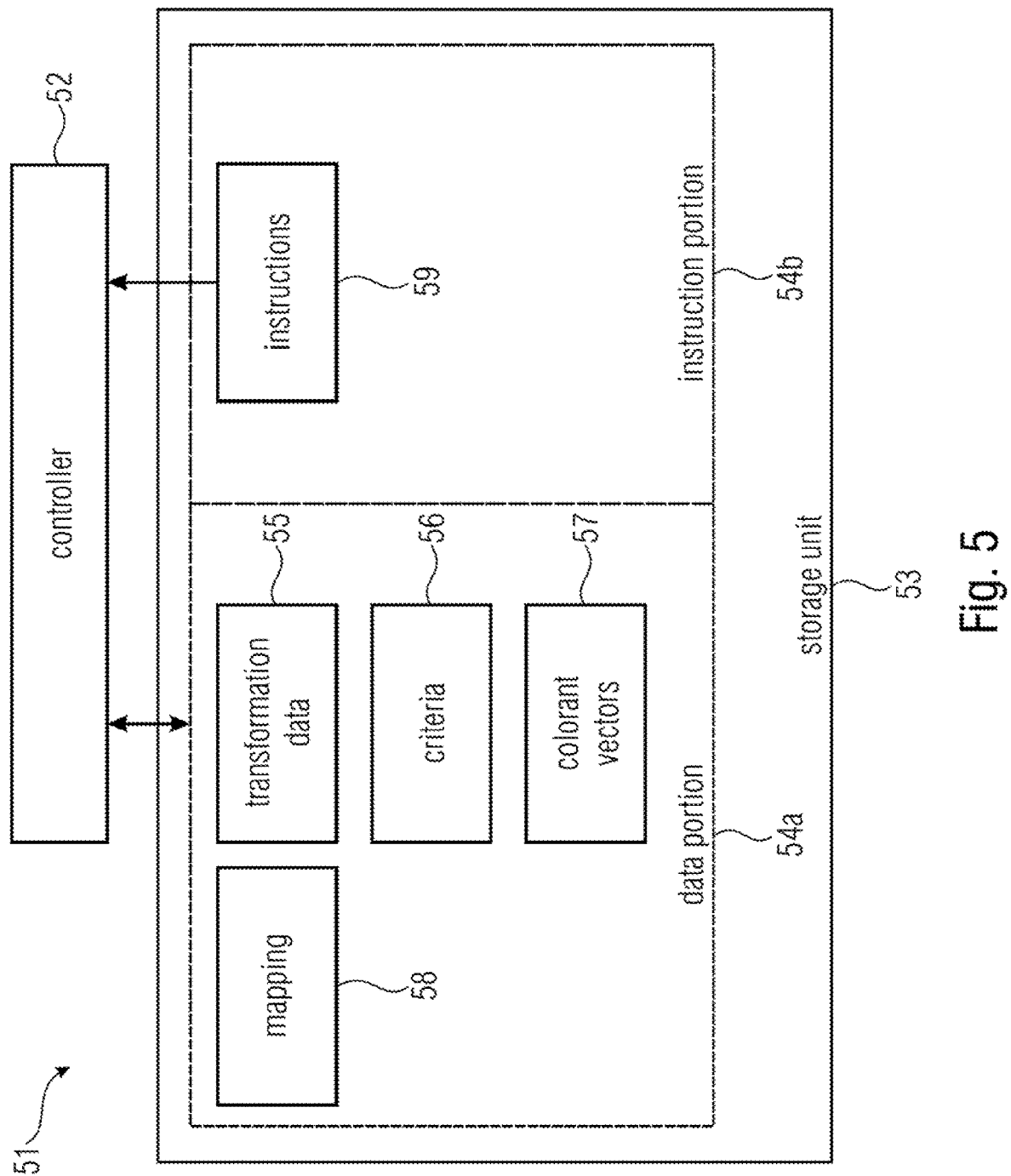
FIG. 5 shows a schematic view of a system according to an example.

FIG. 5 shows a system 51. The system 51 may comprise a controller 52 which may convert colorant vectors into NPac vectors, e.g., for the purpose of creating a LUT to be used for printing.

The controller 52 may have access to a storage unit 53. The storage unit may comprise a transitory processor-readable storage medium (e.g., a random access memory, RAM) which may provide a data portion 54a, and a non-transitory processor-readable storage medium (e.g., a read-only memory, ROM, or a storage space such as a hard disk) which may provide an instruction portion 54b.

The data portion 54a may store a mapping 58, such as a LUT, obtained by converting a plurality of colorant vectors 57 into NPac vectors by making use of criteria 56 (such as those defined for the vector c) and transformation data 55 (such as the matrix A). The criteria 56 may be associated to amounts of NPs to be used in image areas. The criteria 56 may be associated to probabilities of NPs for pixels. The criteria 56 may be selected, for example, by a user for the purpose of obtaining a mapping which permits to achieve a particular purpose (e.g., minimization of Blank spaces).

The instruction portion 54b may store instructions 59 which, when executed by the controller, cause the controller to transform a color space vector to a NPac vector on the basis of the transformation 55 and the criteria 56.

By adopting different criteria on the different components of the probability values for the different components of the NPac vectors to be obtained, it is therefore possible to choose a mapping (LUT) which suites to a particular purpose.

As explained above, according to the user's choice, it is possible to minimize or maximize the Blank space. According to the selection, it is possible to minimize or maximize the use of a particular colorant. According to the selection, it is also possible to give a particular weight to a particular colorant (e.g., a particular ink). According to the selection, it is also possible to optimize the uniformity of use of NPs. According to the selection, it is also possible to reduce or increment the distance between the colorants used for neighbouring pixels.

Depending on certain implementation requirements, examples may be implemented in hardware. The implementation may be performed using a digital storage medium, for example a floppy disk, a Digital Versatile Disc (DVD), a Blu-Ray Disc, a Compact Disc (CD), a Read-only Memory (ROM), a Programmable Read-only Memory (PROM), an Erasable and Programmable Read-only Memory (EPROM), an Electrically Erasable Programmable Read-Only Memory (EEPROM) or a flash memory, having electronically readable control signals stored thereon, which cooperate (or are capable of cooperating) with a programmable computer system such that the respective method is performed. Therefore, the digital storage medium may be computer readable.

Generally, examples may be implemented as a computer program product with program instructions, the program instructions being operative for performing one of the methods when the computer program product runs on a computer. The program instructions may for example be stored on a machine readable medium.

Other examples comprise the computer program for performing one of the methods described herein, stored on a machine readable carrier. In other words, an example of method is, therefore, a computer program having a program instructions for performing one of the methods described herein, when the computer program runs on a computer.

A further example of the methods is, therefore, a data carrier medium (or a digital storage medium, or a computer-readable medium) comprising, recorded thereon, the computer program for performing one of the methods described herein. The data carrier medium, the digital storage medium or the recorded medium are tangible and/or non-transitionary, rather than signals which are intangible and transitory.

A further example comprises a processing unit, for example a computer, or a programmable logic device performing one of the methods described herein.

A further example comprises a computer having installed thereon the computer program for performing one of the methods described herein.

A further example comprises an apparatus or a system transferring (for example, electronically or optically) a computer program for performing one of the methods described herein to a receiver. The receiver may, for example, be a computer, a mobile device, a memory device or the like. The apparatus or system may, for example, comprise a file server for transferring the computer program to the receiver.

In some examples, a programmable logic device (for example, a field programmable gate array) may be used to perform some or all of the functionalities of the methods described herein. In some examples, a field programmable gate array may cooperate with a microprocessor in order to perform one of the methods described herein. Generally, the methods may be performed by any appropriate hardware apparatus.

The above described examples are illustrative for the principles discussed above. It is understood that modifications and variations of the arrangements and the details described herein will be apparent. It is the intent, therefore, to be limited by the scope of the impending patent claims and not by the specific details presented by way of description and explanation of the examples herein.

The invention claimed is:

1. A method comprising:
   transforming a color space vector into a Neugebauer primary area coverage (NPac) vector, to be used for printing, based on criteria comprising amounts or probabilities of Neugebauer primaries (NPs); and
   defining the criteria for determining a resulting amount of Blank spaces to be used for printing, minimizing a probability of colorant overprinting or maximizing a probability of defining Blank spaces.

2. The method of claim 1, comprising:
   using a convex optimization technique based on an objective function associated to the criteria.

3. The method of claim 1, comprising:
   creating a mapping, such as a lookup table (LUT) from a color space to a NPac space.

4. The method of claim 1, comprising:
   generating a print job after transforming the color space vector into the NPac vector.

5. The method of claim 1, comprising:
   classifying an image area to determine if the image area is capable of satisfying the criteria.

6. The method of claim 1, comprising:
   defining the criteria to impose mutual relationships between the different NPs.

7. A system comprising
   a device to transform a color space vector into a Neugebauer primary area coverage (NPac) vector based on data associated to a condition to be fulfilled; and
   defining the criteria for determining a resulting amount of Blank spaces to be used for printing, minimizing a probability of colorant overprinting or maximizing a probability of defining Blank spaces.

8. The system of claim 7, wherein:
   the device is to retrieve the NPac vector which permits an anti-transformation from an NPac space to a color space while verifying the condition.

9. The system of claim 7, wherein the system is to:
   define the condition by establishing quantitative and/or probabilistic conditions on components of the NPac vector to be retrieved.

10. The system of claim 7, wherein the system is to perform a convex optimization technique.

11. A non-transitory processor-readable storage medium comprising instructions that, when executed by the processor, cause the processor to:
    transforming color space vectors into Neugebauer primary area coverage (NPac) vectors by determining Neugebauer primaries (NPs) according to criteria comprising amounts or probabilities of the NPs; and
    defining the criteria for determining a resulting amount of Blank spaces to be used for printing, minimizing a probability of colorant overprinting or maximizing a probability of defining Blank spaces.

12. The non-transitory processor-readable storage medium of claim 11, further comprising instructions that, when executed by the processor, cause the processor to:
    determine NPac vectors which permit an anti-transformation to a color space while satisfying the criteria.

13. The non-transitory processor-readable storage medium of claim 11, further comprising instructions that, when executed by the processor, cause the processor to:
    use a convex optimization technique.

14. The non-transitory processor-readable storage medium of claim 11, further comprising instructions that, when executed by the processor, cause the processor to:
  create a lookup table (LUT) from the NPac vectors.

* * * * *